2,975,188

PROCESS FOR THE PRODUCTION OF SUBSTITUTED 5-AMINOPYRAZOLES

Heinrich Gold, Koln-Stammheim, and Peter Kurtz, Leverkusen-Bayerwerk, Germany, assignors to Farbenfabriken Bayer Aktiengesellschaft, Leverkusen, Germany, a corporation of Germany No Drawing. Filed Jan. 28, 1959, Ser. No. 789,508
Claims priority, application Germany Feb. 4, 1958
10 Claims. (Cl. 260—310)

This invention relates to a process for the production of 5-aminopyrazoles and is more particularly concerned with the production of substituted 5-aminopyrazoles by reacting a substituted or unsubstituted 1-cyano-propadi-1,2-ene upon hydrazine or a monosubstitution product thereof.

It is an object of this invention to provide a process for the production of 5-aminopyrazoles. Another object is to obtain these 5-aminopyrazoles in a simple and most economical manner. Further objects will appear hereinafter.

It has been found that these objects and other advantages can be attained by reacting a substituted or unsubstituted 1-cyano-propadi-1,2-ene with a substituted or unsubstituted hydrazine.

In addition to 1-cyano-propadi-1,2-ene, the substitution products thereof, such as for example 1-cyrano-hexatri-1,2,5-ene, 1-cyano-heptatri-1,2,5-ene or 2-cyano-butadi-2,3-ene, are also suitable for use in the process of the invention. These compounds can be prepared by methods known per se or by reacting 1-halogeno-prop-2-ynes, which may be substituted, in aqueous acid solution in the presence of catalytic quantities of a cuprous compound with hydrogen cyanide (in this connection see for example Examples 1 and 8). Instead of the pure 1-cyano-propadi-1,2-enes, it is also generally possible to use mixtures of these 1-cyano-propadi-1,2-enes with the corresponding isomeric alkynenes, such as are formed when using the procedure referred to above.

When 1-cyano-hexatri-1,2,5-ene is prepared, the reaction product contains 1-cyanohex-5-ene-2-yne as an impurity and, when 1cyano-heptatri-1,2,5-ene is prepared, the reaction product still contains 1-cyano-hepta-5-ene-2-yne as an impurity. If 1-cyano-propadi-1,2-ene is prepared by this method, the reaction product still contains small quantities of 1-cyano-2-chloroprop-2-ene. This reaction product can also be used for the reaction according to the invention, since 1-cyano-2-chloroprop-2-ene yields the same reaction product as 1-cyano-propadi-1,2-ene.

Suitable monosusbtituted hydrazines are the hydrazines of the aliphatic, aromatic and heterocyclic series, such as for example β-hydroxyethyl hydrazine, β-cyanoethyl hydrazine, phenyl hydrazine, p-carboxyphenyl hydrazine, 3-sulfophenyl hydrazine, 8-sulfonaphthyl-(1)-hydrazine, p-nitrophenyl hydrazine, benzthiazolyl-(1)-hydrazine, and also 4,4'-dihydrazinostilbene-2,2'-disulfonic acid.

The reactants for the process of the invention are in general used in about equivalent quantities, i.e. one mol of a 1-cyano-propadi-1,2-ene is employed per mol of a mono-hydrazine or 0.5 mol of a dihydrazine. A more specific embodiment resides in the preparation of an N-substituted 5-aminopyrazole by reacting 0.5 mol of the unsubstituted hydrazine with 1 mol of a 1-cyano-propadi-1,2-ene. The reaction itself is preferably carried out in a solvent, such as for example methanol or water. It is advantageous to work in a weakly alkaline or neutral medium. The reaction generally proceeds exothermically, so that it may be advisable to cool the reaction mixture so that the temperatures reached are not too high. It is however advantageous to work at somewhat elevated temperatures, for example at temperatures in the range from 20 to 50° C. In order to complete the reaction, it may be desirable to follow the latter by heating for some time at relatively high temperatures, for example up to 100° C. This step is particularly to be recommended when the ring closure to form the aminopyrazoles takes place with some difficulty. In these cases, it is also possible to add mineral acid.

The 5-aminopyrazoles obtained according to the process of the invention can be used in known manner for the manufacture of dyes (see for example British patent specification No. 802,097).

Example 1

33 parts by weight of 1-cyanopropadi-1,2-ene are introduced dropwise and while stirring into a mixture of 54 parts by weight of phenyl hydrazine and 200 parts by volume of methanol, introduction being effected at such a rate that the temperature does not exceed 30° C. The mixture can also be suitably cooled with iced water. After the dropwise addition has been completed, the temperature is kept for another 2 hours at 30° C. A mixture of 300 parts by volume of water and 50 parts by volume of concentrated hydrochloric acid is then added and the reaction solution distilled until the temperature of the boiling mixture is 95° C. 69 parts by weight of 1-phenyl-3-methyl-5-aminopyrazole precipitate from the distillation residue cooled to 20° C., on the addition of 60 parts by volume of 40% sodium hydroxide solution. The melting point of the crude product is 108–111° C. and, after recrystallization from benzene, is 116° C. Yield: 80% of the theoretical.

The same product can also be obtained in the following way:

20 parts by weight of 1-cyanopropadi-1,2-ene are added dropwise over a period of 35 minutes to a solution of 35 parts by weight of phenyl hydrazine in 50 parts by volume of benzene. Due to the heat of reaction, the temperature rises to 85° C. The mixture is then kept for 1 hour at 80° C. and thereafter cooled. 25.9 parts by weight of cyanacetone-phenyl hydrazone are crystallized out; melting point after recrystallization: 98–99° C. By concentrating the mother liquor by evaporation, another 29.0 parts by weight of the reaction product are obtained.

12.2 parts by weight of the cyanacetone-phenyl hydrazone described above are heated for 30 minutes to 80° C. with 20 parts by volume of a 20% hydrochloric acid solution is then added at this temperature. An oily substance separates out, but soon crystallizes, and melts at 116° C. after being recrystallized from benzene. This substance is 1-phenyl-3-methyl-5-aminopyarzole.

The 1-cyanopropadi-1,2-ene which is employed is prepared in the following manner:

2500 parts by volume of saturated sodium chloride solution are placed in a round-bottomed flask with a fitted reflux condenser and two dropping funnels. 50 parts by weight of cuprous chloride, about 2 parts by weight of copper powder and 50 parts by volume of concentrated hydrochloric acid are added thereto. The mixture is then heated to 70–75° C. Two electrodes dip into the flask, these electrodes being connected to a recording pH-measuring instrument. Such a quantity of a 30% sodium cyanide solution is now supplied by way of one of the dropping funnels that the pH value is adjusted to 3–4. Thereafter, over a period of 4 hours, 150 parts by weight of 1-chloro-prop-2-yne are added dropwise and at the same time additional quantities of sodium cyanide solution are introduced. The speeds at which the two solutions are added are so controlled that the adjusted pH value does not change throughout the entire experimental period. If the pH value tends to rise, the supply of sodium cyanide solution is reduced, whereas it is increased when the pH value tends to drop. The end of the reaction can be recognized from the fact that the pH value remains constant when the supply of sodium cyanide is shut off. The reaction product can be separated from the catalyst solution by decanting or by steam distillation, and is thereafter dried. The crude product still contains small quantities of 1-cyano-2-chloro-prop-2-ene. It can however be employed without difficulty for the reaction according to the invention.

In order to prepare pure 1-cyanopropadi-1,2-ene, this crude product is distilled by fractionation. 96 parts by weight of a liquid which has a boiling point of 60–67° C./95 mm. are obtained as the main fraction. Yield: 74% of the theoretical, based on the 1-chloroprop-2-yne which is introduced. The pure 1-cyanopropadi-1,2-ene has a refractive index of $n_D^{20}$: 1.4612.

*Example 2*

47 parts by weight of phenyl hydrazine-3-sulphonic acid are dissolved in 300 parts by volume of water by adding 14 parts by weight of sodium carbonate. 17 parts by weight of 1-cyanopropadi-1,2-ene are added dropwise to this solution at 35° C. On completing the dropwise addition, the temperature is kept for another 2 hours at 35° C. 25 parts by volume of concentrated hydrochloric acid are then added, the reaction mixture heated to 98° C. and 80 parts by volume of sodium chloride then added at this temperature. The precipitated crystals are filtered with suction at 20° C. and washed with a small quantity of 30% sodium chloride solution. Yield: 58 parts by weight of 1-(3'-sulphophenyl)-3-methyl-5-aminopyrazole.

*Example 3*

42 parts by weight of β-cyanoethyl hydrazine are dissolved in 100 parts by volume of water and 20 parts by volume of methanol. While maintaining a temperature of approximately 40° C., 33 parts by weight of 1-cyanopropadi-1,2-ene are added dropwise to this solution over a period of 10 minutes. After standing for 2 hours at 40° C., a thick oil has formed under a clear orange-coloured solution, the said oil solidifying in the cold. Yield: 66 parts by weight of 1-(β-cyanoethyl)-3-methyl-5-aminopyrazole (88% of the theoretical). On being crystallised from 530 parts by weight of benzene, the product separates out in the form of colourless crystals with a melting point of 106–108° C.

*Example 4*

47.2 parts by weight of 4-carboxyphenyl hydrazine hydrochloride are dissolved in 250 parts by volume of water and 30 parts by volume of 40% caustic soda solution. 17 parts by weight of 1-cyanopropadi-1,2-ene are added dropwise to this solution at 40° C. The reaction solution is then held for another 2 hours at 80° C. 30 parts by volume of concentrated hydrochloric acid are then added and the mixture heated to boiling point and then allowed to cool. The precipitated crystals are separated and dissolved in 5% sodium hydroxide solution. With acetic acid, 1-(4'-carboxy-phenyl)-3-methyl-5-aminopyrazole is precipitated. M. Pt.: 210–212° C. Yield: 43 parts by weight (80% of the theoretical).

*Example 5*

28 parts by weight of 1-cyanopropadi-1,2-ene are added dropwise to a solution of 30 parts by weight of β-hydroxyethyl hydrazine in 150 parts by volume of methanol, the reaction mixture being heated almost to boiling point. After boiling for 5 hours, 33 parts by volume of concentrated hydrochloric acid are added and the mixture is boiled for another 30 minutes. The pH value is then adjusted to 7 with sodium hydroxide solution, the reaction mixture is concentrated by evaporation on a water bath and the evaporation residue is extracted with 300 parts by volume of alcohol. 40 parts by weight of 1-(β-hydroxyethyl)-3-methyl-5-aminopyrazole with a boiling point of 190° C./16 mm. and a melting point of 65° C. are obtained from the alcoholic solution by distillation. The yield is 71% of the theoretical.

*Example 6*

59 parts by weight of 8-sulphonaphthyl-(1)-hydrazine are dissolved at 35° C. in 300 parts by volume of water with the addition of 13.5 parts by weight of sodium carbonate. 17 parts by weight of 1-cyanopropadi-1,2-ene are added dropwise to this solution, which now shows a pH value of 7.5, while the temperature is kept by gentle cooling with iced water at 45° C. Thereafter, the reaction mixture is held for 4 hours at 80° C. and 30 parts by volume of concentrated hydrochloric acid are then added and the temperature kept for another hour at this level. On cooling to 20° C. 85% of the calculated quantity of 1-(8'-sulphonaphthyl-(1'))-3-methyl-5-aminopyrazole separates out.

*Example 7*

29 parts by weight of 4,4'-dihydrazinostilbene-2,2'-disulphonic acid are dissolved at 35° C. in 300 parts by volume of water containing 8 parts by weight of sodium carbonate. 10 parts by weight of 1-cyanopropadi-1,2-ene are added and the reaction mixture is then heated for 2 hours at 80° C. 20 parts by volume of concentrated hydrochloric acid are then added dropwise and the precipitated slight yellowish green 4,4'-bis(5''-amino-3''-methyl pyrazolyl-(1''))-stilbene-2,2'-disulphonic acid is recrystallized from dilute sodium chloride solution. The yield is 40%.

*Example 8*

21 parts by weight of 1-cyanohexatri-1,2,5-ene are added to a solution of 21.6 parts by weight of phenyl hydrazine in 100 parts by volume of methanol, the temperature rising from 20° to 80° C. After boiling for 10 hours, the methanol is distilled off and the remaining oil is distilled in vacuo. 1-phenyl-3-(but-3-ene-1-yl)-5-aminopyrazole is obtained, B.P.: 210–214° C./13 mm. The yield is 41 parts by weight (96% of the theoretical).

The same product is obtained if 21.6 parts by weight of phenyl hydrazine are reacted in the same way with 21.0 parts by weight of a mixture containing cyanohexatri-1,2,5-ene, cyanohex-5-ene-2-yne, and less than 10% of cyanohexatri-1,3,5-ene such as is obtained directly as a crude product, from hex-5-en-2-ynyl chloride.

The crude 1-cyanohexatri-1,2,5-ene used as starting material is prepared in the following manner:

Using the process indicated in Example 1 for the production of 1-cyanopropadi-1,2-ene, 150 parts by weight of hex-5-en-2-ynyl chloride are reacted with sodium cyanide (as a 30% solution) in 2500 parts by volume of saturated common salt solution which contains 30 parts by weight of cuprous chloride and 30 parts by volume of concentrated hydrochloric acid, at pH 3–3.4 and at temperature of 80° C. The reaction product is distilled with steam and worked up as described in Example 1. 90.5 parts by weight (66% of the theoretical) of a liquid which boils at 78–85° C./13 mm. and has a refractive index of $n_D^{20}$ 1.4669 are obtained. This crude product consists of a mixture of 1-cyanohexatri-1,2,5-ene and 1-cyanohex-5-en-2-yne. As impurity it contains 1-cyanohexatri-1,3,5-ene in a quantity of less than 10%.

This crude product can be used directly for the preparation of 1-phenyl-3-(but-3-en-1-yl)-5-aminopyrazole.

Pure cyanohexatri-1,2,5-ene is obtained from the crude product by isomerisation of the 1-cyanohex-5-en-2-yne fraction, by known methods, by treatment with a weakly alkaline agent, such for example as sodium phenate. The pure 1-cyanohexatri-1,2,5-ene has a boiling point of 77–78° C./15 mm. and a refractive index of $n_D^{20}$ 1.4892.

Example 9

16 parts by weight of 1-2-ene are added to 700 parts by weight of a menthanolic solution containing 46.7 parts by weight of 3-sulphonamidophenyl hydrazine at a temperature of 20° C., the temperature rising over a period of 30 minutes to 35° C. The mixture is heated for another 2 hours at 50° C., 150 parts by volume of 10% hydrochloric acid are then added and the solution boiled for 10 minutes. After cooling to 20° C. 1-(3-sulphonamidophenyl)-3-methyl-5-aminopyrazole is precipitated by adding sodium acetate. The compound melts at 107° C. when recrystallized from water.

Example 10

93.5 parts by weight of 4-sulphonamidophenyl hydrazine are suspended in 300 parts by volume of methanol and 33 parts by weight of 1-cyanopropadi-1,2-ene are added to this suspension. The temperature rises slowly to 40° C. and must be kept at this temperature by cooling at intervals. A substantially clear solution is formed temporarily, from which the addition product crystallizes out. After adding 40 parts by volume of concentrated hydrochloric acid and 300 parts by volume of water, the methanol is distilled off until the temperature of the boiling solution is 95° C. By adding sodium acetate, 103 parts by weight of 1-(4-sulphonamidophenyl)-3-methyl-5-aminopyrazole are precipitated, this being 82% of the theoretical; melting point 227–228° C.

Example 11

143 parts by weight of m-chlorophenyl hydrazine hydrochloride are stirred into 500 parts by volume of methanol and the suspension is adjusted to pH 8 with 10% sodium hydroxide solution. The solution obtained is now filtered and to the filtrate is added dropwise 54 parts by weight of 1-cyanopropadi-1,2-ene while the temperature is kept at 30–50° C. by cooling at intervals. After 3 hours, a thick crystal magma has formed. By adding 70 parts by volume of concentrated hydrochloric acid, the pH value is now adjusted to 3 and the methanol is then distilled off on a water bath. With sodium hydroxide solution, 160 parts by weight of 1-(3-chlorophenyl)-3-methyl-5-aminopyrazole are precipitated from the aqueous distillation residue. Crystallized from alcohol or benzene the compound melts at 138–140° C.

Example 12

33 parts by weight of 1-cyanopropadi-1,2-ene are added dropwise to 112 parts by weight of 90% hydrazine hydrate, while the temperature is kept at 30–40° C After standing for 16 hours, the water and excess hydrazine hydrate is evaporated in a vacuum of 16 mm. Hg and the remaining pyrazole derivative is also distilled. Boiling point at 0.05–0.1 mm. Hg 135–139° C. Yield: 33 parts by weight of 3-methyl-5-aminopyrazole, this being 68% of the theoretical.

Example 13

13.5 parts by weight of 92.5% hydrazine hydrate solution are introduced dropwise into a solution of 33 parts by weight of 1-cyanopropadi-1,2-ene in 100 parts by volume of methanol, while the reaction mixture is kept at a temperature of 20–25° C. by cooling. After the temperature has been held for another two hours at 20° C., 80 parts by volume of water are added and the methanol is distilled off until the temperature of the boiling solution is 95° C. After cooling to 10° C., 1-(1-cyanoprop-1-en-2-yl)-3-methyl-5-aminopyrazole crystallizes out. Needles with a melting point of 85–86° C. are obtained on recrystallizing from water.

Example 14

165 parts by weight of 2-hydrazinobenzthiazole are dissolved in 1000 parts by volume of dioxane at boiling temperature and the suspension formed after cooling to 70° C. is mixed, while stirring, with 65 parts by weight of 1-cyanopropadi-1,2-ene, the temperature of the reaction mixture being kept at 70° C. by cooling. The clear solution is now held at 70–80° C. for another 4 hours. The solution is then adjusted to give an acid reaction to Congo by adding 100 parts by volume of fuming hydrochloric acid, and the temperature is maintained for another hour at 70° C. After cooling to 20–25° C., 1-(benzthiazolyl-2)-3-methyl-5-aminopyrazole is precipitated by adding sodium hydroxide solution and 3200 parts by volume of water. When crystallized from benzene, it melts at 188–190° C.

Example 15

94.2 parts by weight of a mixture of 20 mol percent of 1-cyano-2-chloroprop-2-ene and 80 mol percent of 1-cyanopropadi-1,2-ene are introduced dropwise into a solution of 108 parts by weight of phenyl hydrazine in 200 parts by volume of methanol at 30° C. and the solution obtained is then boiled for 3 hours under reflux. During this time a solution of 12 parts by weight of sodium carbonate in 80 parts by volume of water is added dropwise in order to keep the pH value of the solution at 6–7. After this time, the solution is adjusted to give an acid reaction to Congo by adding 200 parts by volume of 18% hydrochloric acid. The methanol is then distilled off and 1-phenyl-3-methyl-5-aminopyrazole is precipitated from the residual aqueous solution after cooling to 20–25° C. by the addition of sodium hydroxide solution. It melts at 114–115° C.

What we claim is:

1. Process for the production of substituted 5-aminopyrazoles which comprises reacting at a temperature within the range of from about 0 to about 100° C. one mol of a compound which is a member selected from the group consisting of 1-cyano-propadi-1,2-ene, 3-alkyl-1-cyano-propadi-1,2-ene, 3-alkanol-1-cyano-propadi-1,2-ene, 1-cyano-hexatri-1,2,5-ene, 1-cyano-heptatri-1,2,5-ene, and 2-cyano-butadi-2,3-ene with about 0.5 to about 1 mol of a compound having the following general formula:

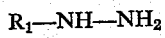

in which $R_1$ is a member selected from the group consisting of hydrogen, lower alkyl, lower cyanoalkyl, lower hydroxyalkyl, phenyl, hydroxyphenyl, cyanophenyl, carboxyphenyl, sulfonaphthyl, sulfophenyl, nitrophenyl, halogenophenyl, cyanohalogeno-alkyl, naphthyl, 2-benzthiazolyl and 4-hydrazino-2,2'-disulfostilbyl radicals, and recovering the substituted 5-aminopyrazole thus formed.

2. Process according to claim 1 in which said first mentioned group member is 1-cyano-propadi-1,2-ene and said compound is employed in admixture with a smaller amount of 1-cyano-2-chloro-prop-2-ene.

3. Process according to claim 1, in which said first mentioned group member is 1-cyanopropadi-1,2-ene and said compound is employed in admixture with a smaller amount of the corresponding isomeric 1-cyanoprop-2-yne compound.

4. Process for the production of 1-phenyl-3-methyl-5-aminopyrazole which comprises reacting at a temperature within the range of from about 30 to about 100° C. about equimolecular amounts of 1-cyano-propadi-1,2-ene with phenyl hydrazine and recovering the 1-phenyl-3-methyl-5-aminopyrazole formed.

5. Process for the production of 4,4'-bis-(5"-amino-3"-methylpyrazolyl-(1"))-stilbene-2,2'-disulfonic acid which comprises reacting at a temperature within the range of from about 35 to about 80° C. about one mol of 1-cyanopropadi-1,2-ene with about 0.5 mol 4,4'-hydrazinostilbene-2,2'-disulfonic acid and recovering the 4,4'-bis-(5" - amino - 3" - methylpyrazolyl - (1")) - stilbene-2,2'-disulfonic acid formed.

6. Process for the production of 1-phenyl-3-(but-3-ene-1-yl-5-aminopyrazole which comprises reacting at a temperature within the range of from about 20 to about 100° C. about equimolecular amounts of 1-cyano-hexatri-1,2,5- ene with phenylhydrazine and recovering the 1-phenyl-3-(but-3-ene-1-yl-5-aminopyrazole formed.

7. Process for the production of 1-(4-sulfoamidophenyl)-3-methyl-5-aminopyrazole which comprises reacting at a temperature within the range of from about 30 to about 40° C. about equimolecular amounts of 1-cyanopropadi-1,2-ene with 4-sulfoamidophenyl hydrazine, and recovering the 1-(4-sulfoamidophenyl)-3-methyl-5-aminopyrazole formed.

8. Process for the production of 3-methyl-5-aminopyrazole which comprises reacting at a temperature within the range of from about 30 to about 40° C. about equimolecular amounts of 1-cyanopropadi-1,2-ene with hydrazine hydrate (90%) and recovering the 3-methyl-5-aminopyrazole formed.

9. Process for the production of 1-(benzthiazolyl-2)-3-methyl-5-aminopyrazole which comprises reacting at a temperature within the range of from about 70 to about 80° C. about equimolecular amounts of 1-cyanopropadi-1,2-ene with 2-hydrazine benzthiazol and recovering the 1-(benzthiazolyl-2)-3-methyl-5-aminopyrazole formed.

10. Process for the production of 1-phenyl-3-methyl-5-aminopyrazole which comprises reacting at a temperature within the range of from about 30 to about 60° C. about equimolecular amounts of a mixture consisting of 1-cyanopropadi-1,2-ene (80 mol-percent) and 1-cyano-2-chloroprop-2-ene (20 mol-percent) with phenyl hydrazine and recovering the 1-phenyl-3-methyl-5-aminopyrazole formed.

References Cited in the file of this patent

UNITED STATES PATENTS 2,726,248    Kendall et al. _____ Dec. 6, 1955

UNITED STATES PATENT OFFICE
CERTIFICATION OF CORRECTION

Patent No. 2,975,188                             March 14, 1961

Heinrich Gold et al.

It is hereby certified that error appears in the above numbered patent requiring correction and that the said Letters Patent should read as corrected below.

Column 1, line 31, for "1-cyrano-hexatri-" read -- 1-cyano-hexatri- --; line 46, for "1cyano-heptatri-1,2,5-ene" read -- 1-cyano-heptatri-1,2,5-ene --; column 2, line 50, after "acid" insert -- solution, a clear solution being formed. Sodium hydroxide --; column 4, line 32, for "slight" read -- slightly --; column 5, line 2, for "1-2-ene" read -- 1-cyanopropadi-1,2-ene --.

Signed and sealed this 8th day of August 1961.

(SEAL)
Attest:

ERNEST W. SWIDER                          DAVID L. LADD
Attesting Officer                            Commissioner of Patents